United States Patent
Lewis

(10) Patent No.: US 7,271,353 B1
(45) Date of Patent: Sep. 18, 2007

(54) SCALE WHICH INDICATES A RELATIVE FORCE APPLIED BETWEEN TWO ATTACHMENT POINTS

(75) Inventor: John J. Lewis, San Jose, CA (US)

(73) Assignee: TFB Global LLC, San Jose, CA (US)

( * ) Notice: Subject to any disclaimer, the term of this patent is extended or adjusted under 35 U.S.C. 154(b) by 0 days.

(21) Appl. No.: 11/473,700

(22) Filed: Jun. 22, 2006

Related U.S. Application Data

(60) Provisional application No. 60/759,756, filed on Jan. 18, 2006.

(51) Int. Cl.
*G01G 19/58* (2006.01)

(52) U.S. Cl. .................. 177/131; 177/148; 177/175; 177/257; 177/245; 190/115

(58) Field of Classification Search ........... 177/131, 177/147–149, 175, 257, 245; 190/115
See application file for complete search history.

(56) References Cited

U.S. PATENT DOCUMENTS

| 2,518,973 | A | | 8/1950 | Atherton |
|---|---|---|---|---|
| 2,710,083 | A | | 6/1955 | William |
| 2,759,577 | A | | 8/1956 | William |
| 2,937,016 | A | | 5/1960 | Westman |
| 3,090,454 | A | | 5/1963 | Farrar et al. |
| 4,482,783 | A | * | 11/1984 | Laimins ..................... 177/147 |
| 4,936,399 | A | * | 6/1990 | Christman et al. ......... 177/210 C |
| 5,031,710 | A | * | 7/1991 | Parker et al. .............. 177/210 FP |
| 5,033,563 | A | * | 7/1991 | Brainerd et al. ............ 177/132 |
| 5,576,521 | A | | 11/1996 | Dubach |
| 6,121,555 | A | * | 9/2000 | Nowosielski et al. ........ 177/45 |
| 6,329,612 | B1 | * | 12/2001 | von Schroeter ............ 177/144 |
| 7,022,921 | B2 | * | 4/2006 | Petrotto ..................... 177/144 |
| 2005/0051586 | A1 | | 3/2005 | Siwak et al. |
| 2005/0224261 | A1 | * | 10/2005 | Marks |
| 2006/0207850 | A1 | * | 9/2006 | Lewis |
| 2007/0007048 | A1 | * | 1/2007 | Gill |
| 2007/0045011 | A1 | * | 3/2007 | Dittrich et al. |

FOREIGN PATENT DOCUMENTS

| GB | 2385142 | 8/2003 |
|---|---|---|
| GB | 2411966 | 9/2005 |
| WO | WO 03/100360 | 12/2003 |

\* cited by examiner

*Primary Examiner*—Randy W Gibson
(74) *Attorney, Agent, or Firm*—Sawyer Law Group LLP

(57) ABSTRACT

The present invention provides airline travelers with a method of determining baggage weight compliance while traveling, prior to having baggage rejected or additional fees assessed at the baggage check counter at the airport. In a first aspect, a scale is disclosed that comprises first and second attachment points, wherein the scale indicates a relative force applied to the attachment points. In a second aspect, a scale is disclosed which comprises two independent attachment points wherein the scale can display the total force applied to the attachment points.

6 Claims, 4 Drawing Sheets

SCALE WHICH INDICATES A RELATIVE FORCE APPLIED BETWEEN TWO ATTACHMENT POINTS

CROSS-REFERENCE TO RELATED APPLICATIONS

This application claims the benefit under 35 USC 119(e) of provisional patent application No. 60/759,756, filed Jan. 17, 2006.

FIELD OF THE INVENTION

The present invention relates generally to luggage and more specifically to the weighing of luggage.

BACKGROUND OF THE INVENTION

Often at airports and other such locations there is a weight limit for each piece of luggage. If one or more pieces of a customer's luggage exceed this weight limit, then additional fees are assessed. Also, the traveler must then either find a way to reduce the weight and contents of the luggage or pay for an additional piece of luggage. In addition to the inconvenience experienced by the traveler and the additional fees, the traveler may have to miss a scheduled flight and as a result suffer even greater inconvenience and expense.

Placing luggage bags on a typical home scale, such as a bathroom scale, is a clumsy and difficult process. Oftentimes the display of the scale is covered by the luggage, which may be much larger and bulkier in size than the scale. It is also difficult to place luggage on a home scale and to keep it steady without holding it and thereby affecting the weight measurement. Each time the luggage needs to be weighed with a conventional home scale, the suitcase or bag must be closed before attempting to place it on the small-sized scale. What is needed is a method by which a customer can weigh luggage as it is being packed, to make sure that it fits within required weight limits before it taken to the airport or location for transport. The present invention meets this need.

SUMMARY OF THE INVENTION

The present invention provides airline travelers with a method of determining baggage weight compliance while traveling, prior to having baggage rejected or additional fees assessed at the baggage check counter at the airport. In a first aspect, a scale is disclosed that comprises first and second attachment points, wherein the scale indicates a relative force applied to the attachment points. In a second aspect, a scale is disclosed which comprises two independent attachment points wherein the scale can display the total force applied to the attachment points.

DETAILED DESCRIPTION

The present invention relates to generally to luggage and more specifically to the weighing of luggage. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides an individual with a method for determining the weight of a piece of luggage (a suitcase, for example) without using a standalone utility scale.

Figure 1:
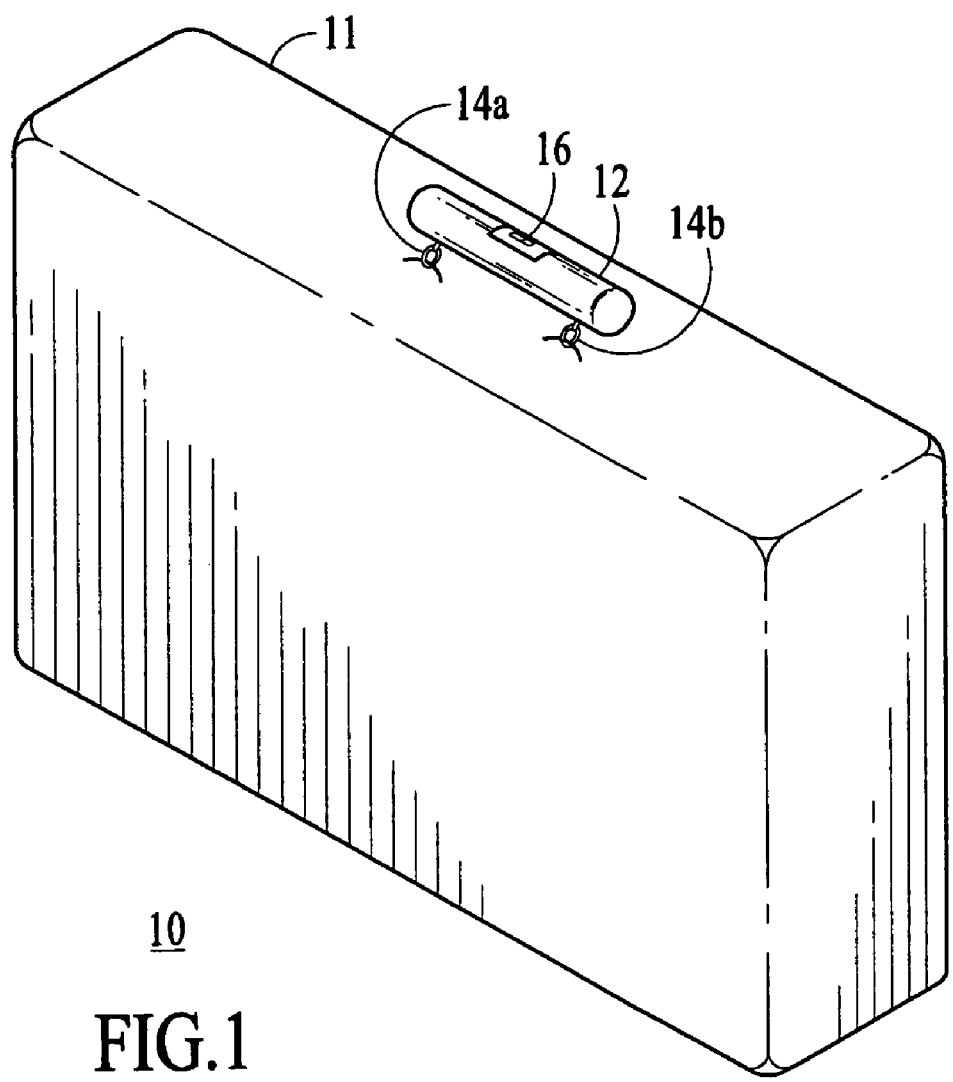
FIG. 1 shows a suitcase with a handle, attachment fittings and a scale located in the handle in accordance with the present invention.

FIG. 1 shows a suitcase 10 in accordance with the present invention. The suitcase 10 includes a body portion 11 and a handle 12. The suitcase 10 further includes attachment fittings 14a and 14b which attach the handle 12 to the suitcase, and a weight scale 16 located in the handle in accordance with the present invention.

Figure 2:
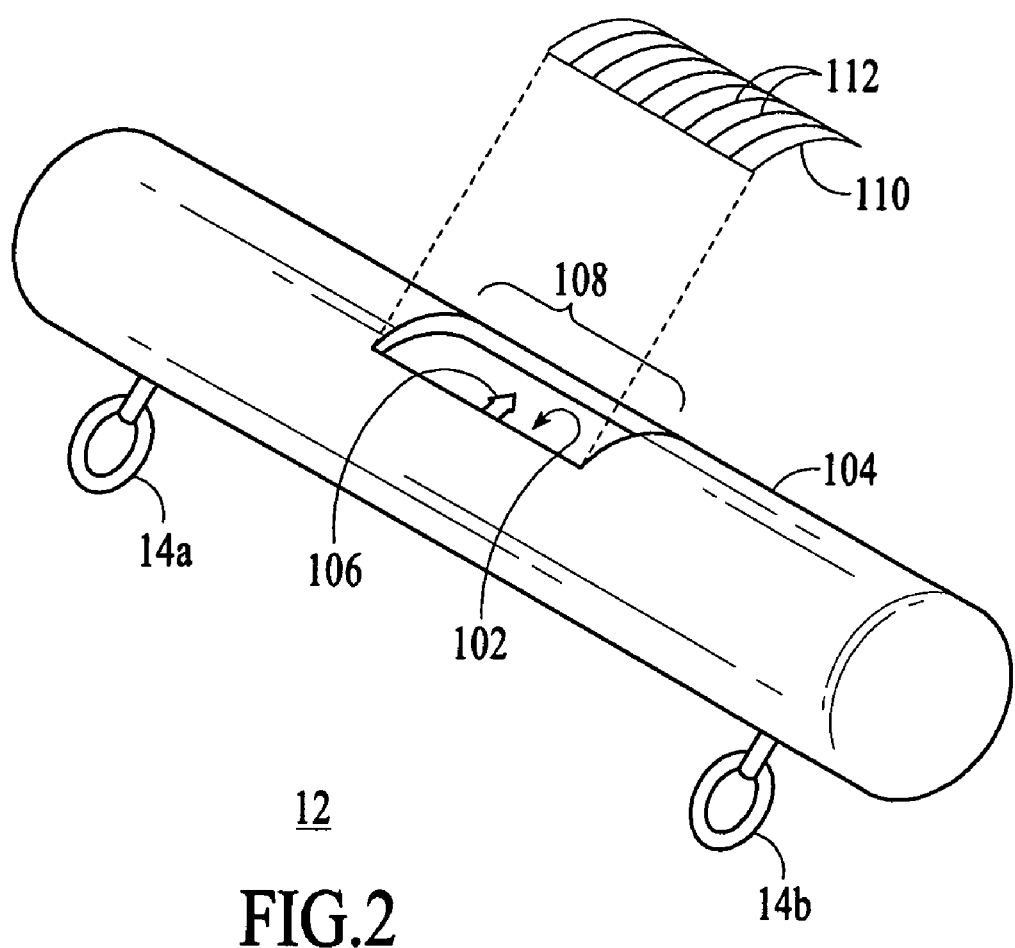
FIG. 2 is a detailed illustration of the handle of the suitcase in accordance with the present invention.

FIG. 2 is a partially expanded illustration of the handle 12 of the suitcase in accordance with the present invention. The handle 12 includes attachment points 14a and 14b, a spring or compression scale 102, a window 210 with an indicator scale 112. Attachment points 14a and 14b are used to attach the handle 12 to the suitcase or piece of luggage (not shown). The attachment points 14a-14b may be permanently connected to the body 11 of the suitcase or they may be detachable, allowing the handle 12 to detach from the suitcase body 11. The attachment points 14a-14b connect to a spring or compression scale 102 which is contained within the handle shell 104. The handle 12 is fitted with an opening 108 and a spring or compression scale 102 within the handle shell 104.

As is seen in FIG. 2, a window 110 with an indicator scale 112 fits within the opening 108 in the handle shell, thereby covering the spring scale 102 and the scale pointer 106. The window 110 could be made from any kind of clear material such as plastic, glass, or any other transparent material. The indicator scale 112 has markings on it which indicate weight in pounds, ounces, a metric scale, or other measurement scales, and is calibrated to include the total weight of the suitcase and handle/scale combination, so that an accurate weight reading may be determined. When a person lifts the suitcase from a surface so that the suitcase is supported only by the person holding the suitcase, the scale pointer 106 will point to markings on the indicator scale 112 which indicate the weight of the suitcase. In this way a person may determine the weight of the suitcase.

The markings on the indicator scale, as indicated above, may be displayed in pounds, ounces, the metric system, or in any other desired weight measurement system. It would also be possible to utilize markings on the indicator scale which indicate weight limits imposed by specific airlines, transport companies, mailing systems or the like.

Figure 3:
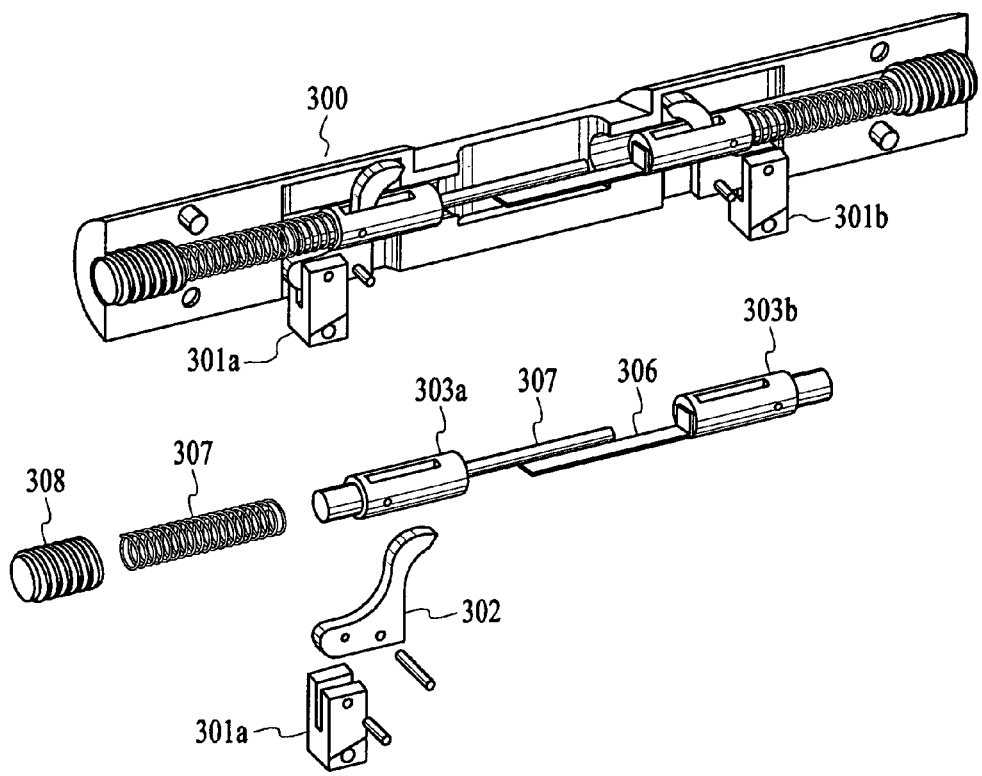
FIG. 3 illustrates a second embodiment of a handle

FIG. 3 illustrates a second embodiment of a handle. The handle is coupled to a body portion of a suitcase, for example the handle comprises a handle shell (300). Within the shell is a mechanism (301, 302, 303) coupled to the body portion. Each attachment point (301a, 301b) moves independently causing an indicator (305) to move a distance proportionate to the weight suspended by the mechanism and causing a scale (306) adjacent to the indicator to move a distance proportionate to the weight suspended. In abstract, a device used to weigh items at two attachment points where the item being weighed has a variable center of gravity, which include a handle 300 and two attaching points 301a and 301b. Enclosed within the handle is a pair of cams 302 and followers 303 whereby the vertical force applied to the attachment points 301a and 301b is converted to a lateral force and movement of the cam followers 303a and 303b. Variations in weight attached and suspended at attachment points 301a and 301b result in a change in the lateral displacement of followers 303a and 303b and a resultant change in the relative positions of 305 and 306. The relative measurement of force suspended at attachment points (301a or 301b may be observed by an offset distance change between 305 and 306. The combined movements of the independent mechanisms result in a totalized weight indication suspended at the attachment points.

Figure 4:
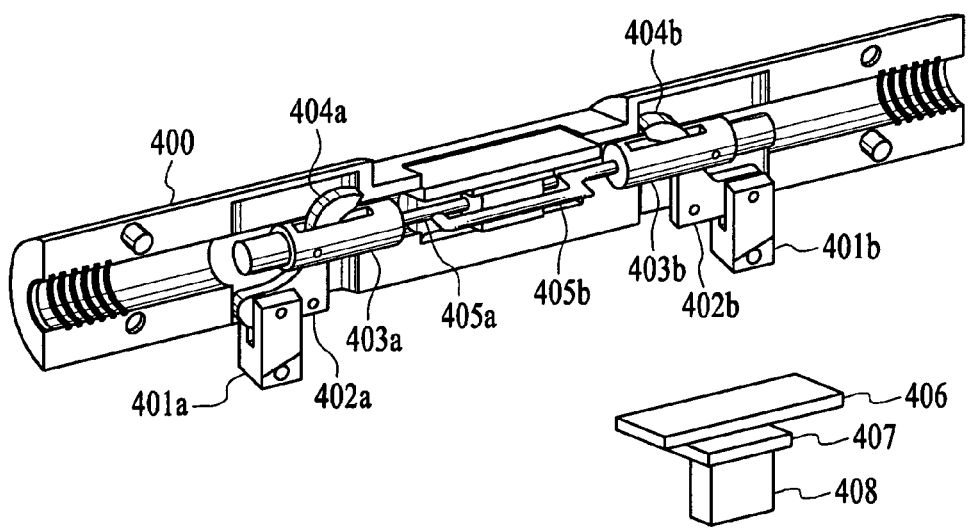
FIG. 4 illustrates a third embodiment of a handle

FIG. 4 illustrates a third embodiment of a handle. The handle is coupled to a body portion of a suitcase, for example the handle comprises a shell (400); within the shell is a mechanism (401,402, 403, 404) coupled to the body portion; where each attachment point moves independently; causing pressure to be transferred by a link(s) (405a & 405b) and a transducer (408) sends a relative signal to a microprocessor (407). The microprocessor provides an indication of the totalized weight on a LCD (406). In abstract, a device used to weigh items at two attachment points where the item being weighed has a variable center of gravity, which include a handle 400 and two attaching points 401a and 401b. Enclosed within the handle is a pair of cams 402 and followers 403a and 403b whereby the vertical force applied to the attachment points 401a and 401b is converted to a lateral force and movement of the cam followers 403a and 403b. Variations in weight attached and suspended at attachment points 401a and 401b result in a change in force applied to a pressure transducer or strain gauge 408. The relative measurement of force suspended at attachment points 401a and 401b may be observed as a digital value displayed on an electronic display screen 406. The combined pressure of the independent mechanisms result in a totalized weight indication suspended at the attachment points.

Although the present invention has been described in accordance with the embodiments shown, one of ordinary skill in the art will readily recognize that there could be variations to the embodiments and those variations would be within the spirit and scope of the present invention. Although two attachment points are utilized in the preferred embodiment, one of ordinary skill in the art readily recognizes that a plurality of attachment points could be utilized and that they would be within the spirit and scope of the present invention. Additionally, one of ordinary skill in the art readily recognizes that the scale could utilize a digital readout, and be within the spirit and scope of the present invention.

Although a suitcase is shown as a preferred embodiment, one of ordinary skill in the art readily recognizes that other types of pieces of luggage may be utilized, such as bags or containers of various kinds, and that they would also be within the spirit and scope of the present invention.

Accordingly, many modifications may be made by one of ordinary skill in the art without departing from the spirit and scope of the appended claims.

What is claimed is:

1. A scale comprising:
    first and second attachment points; and
    a set of cams and followers to transfer force and motion between the attachment points, wherein the scale indicates a relative force applied to the attachment points.

2. The scale of claim 1 wherein the relative force is applied symmetrically to the two attachment points.

3. The scale of claim 1 wherein the relative force is applied asymmetrically to the two attachment points.

4. A scale comprising:
    two independent attachment points wherein the scale can display the total force applied to the two attachment points; and
    a set of cams and followers to transfer force and motion between the attachment points.

5. A suitcase comprising:
    a body portion; and
    a handle coupled to the body portion, wherein the handle comprises a handle shell (300); within the shell is a mechanism (301, 302, 303) coupled to the body portion, the mechanism including a plurality of attachment points; where each attachment point (301a, 301b) moves independently; causing an indicator (305) to move a distance proportionate to the weight suspended by the mechanism; and causing a scale (306) adjacent to the indicator to move a distance proportionate to the weight suspended, the mechanism includes a set of cams and followers to transfer force and motion between the attachment points; where the combined movements of the independent mechanisms result in a totalized weight indication suspended at the attachment points.

6. A suitcase comprising:
    a body portion; and
    a handle coupled to the body portion, wherein the handle comprises a handle shell (400); within the shell is a mechanism (401,402, 403, 404) coupled to the body portion, the mechanism including a plurality of attachment points; where each attachment point moves independently; causing pressure to be transferred by a link(s) (405a & 405b); and the transducer (408) sends a relative signal to a microprocessor (407); and the microprocessor provides an indication of the totalized weight on a LCD) (406), the mechanism includes a set of cams and followers to transfer force and motion between the attachment points; where the combined pressure of the independent mechanisms result in a totalized weight indication suspended at the attachment points.

* * * * *